Jan. 28, 1941. G. S. PETERSON 2,229,934
FOOD PAN
Filed Jan. 13, 1940
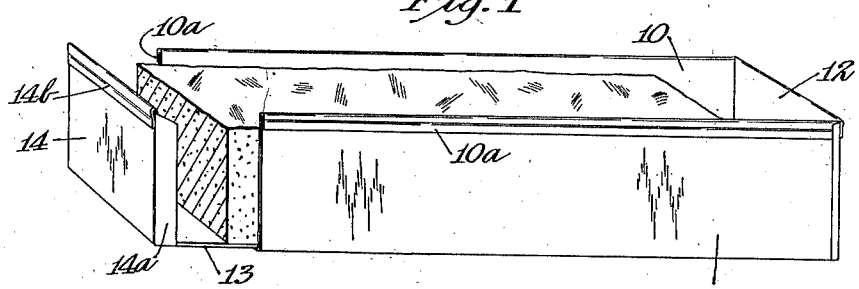
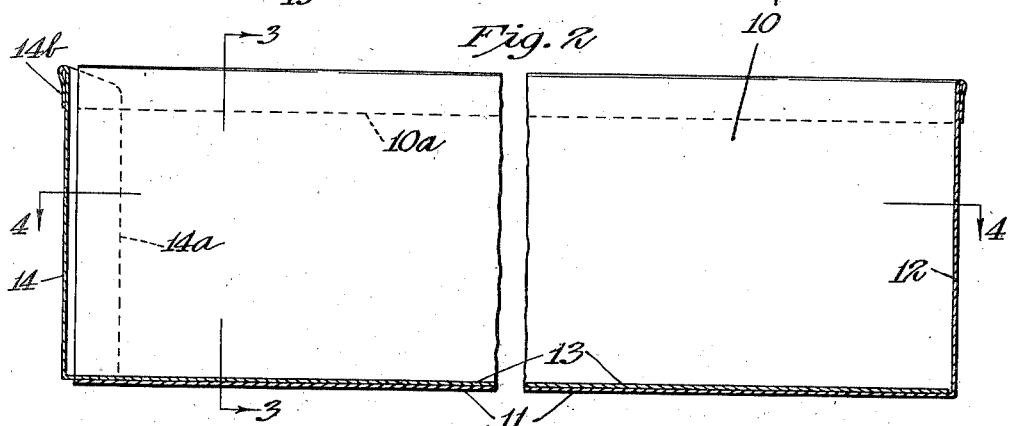
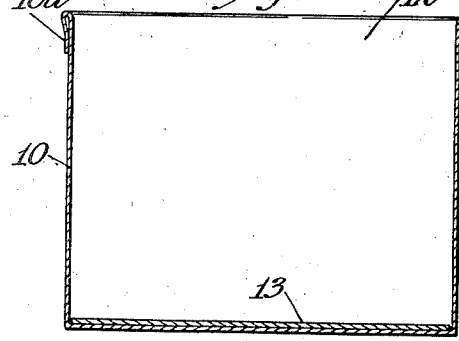
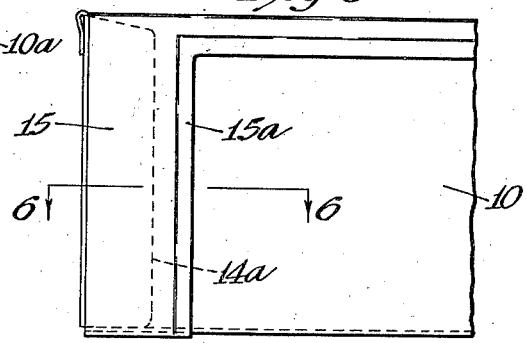
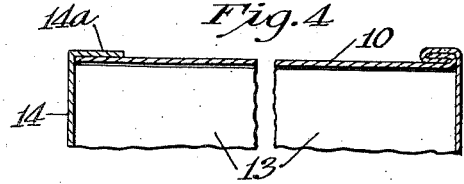
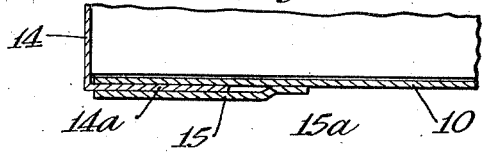
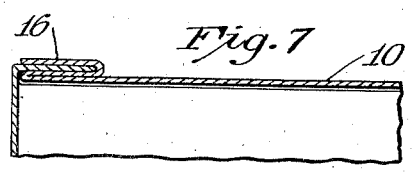
Inventor
Gertrude S. Peterson
By Williamson & Williamson
Attorneys Patented Jan. 28, 1941

2,229,934

UNITED STATES PATENT OFFICE 2,229,934

FOOD PAN

Gertrude S. Peterson, Long Prairie, Minn.

Application January 13, 1940, Serial No. 313,763

2 Claims. (Cl. 53—6)

This invention relates to pans and molds for preparing and cooking food, and particularly to a pan in which food may be molded or cooked and slices taken from the prepared food without removing the same from the pan.

It is an object of my invention to provide a simple and efficient food pan having an extensible wall and bottom whereby food molded or cooked therein may be sliced without removing the same from the mold or container.

It is a further object to provide a pan of the class described which is adapted for a wide variety of uses for baking or otherwise cooking food, as well as for molding or forming food products.

These and other objects and advantages of the invention will more fully appear from the following description made in connection with the accompanying drawing, wherein like reference characters refer to the same parts throughout the views, and in which:

Fig. 1 is a perspective view of an embodiment of my invention showing the pan in position for slicing the food product molded therein;

Fig. 2 is a vertical section taken longitudinally of the pan;

Fig. 3 is a cross section taken on the line 3—3 of Fig. 2;

Fig. 4 is a horizontal section taken on the line 4—4 of Fig. 2;

Fig. 5 is a fragmentary side elevation of a somewhat different form of my invention;

Fig. 6 is a cross section taken on the line 6—6 of Fig. 5, and

Fig. 7 is a horizontal section illustrating a still different form of the invention.

In the embodiment of the invention shown in Figs. 3 to 4 inclusive, my pan comprises a rectangular open-topped construction formed from suitable material such as sheet metal, and having upstanding side walls 10, bottom 11 and a fixed end wall 12. The upper edges of side walls 10 and the end wall 12 are re-enforced by turned flanges, and the extremities of walls 10 and 12 are secured together in sealed relationship.

Bottom 11 functions chiefly as a guide for the slidable bottom 13 of the pan which, as illustrated, is of rectangular shape conforming to the shape of bottom 11. An upstanding end wall 14 is rigidly secured to or integrally formed with slidable bottom 13 to form the closure at one end of the pan, and is provided with sealing flanges 14a at the ends thereof angled with respect to end 14 and bent to resiliently engage against the adjacent portions of the side walls 10 to form a sealed joint therewith when the extensible portion comprising the bottom 13 and wall 14 is disposed in closed position. The upper ends of the sealing flanges 14a are adapted to fit into the turned flanges 10a of the side walls to secure the extensible portion in position and to further seal the joints between the extensible portion and the stationary portion of the pan. Wall 14 at its upper edge is re-enforced in the manner of the side walls 10 by a turned flange 14b.

In closed position the pan resembles the ordinary rectangular pan for cooking or molding food products, sealing flanges 14a being disposed flush against the ends of walls 10, as shown in Fig. 2.

In use, a prepared food product such as batter, dough, gelatin mixtures, etc. is poured into the pan in the usual manner and the product molded and/or cooked. When it is desired to utilize the food product, the extensible portion of the pan including the end wall 14 and slidable bottom 13 is withdrawn and successive slices of the product may be obtained without removing the same from the pan. In slicing, the end edges of the walls 10 may be utilized as a guide for the knife to facilitate precise cutting of the food material. With some products it may be necessary to cut along the side walls 10 and end wall 12 to free the product from the pan.

My improved construction obviously has a very wide variety of applications in baking, cooking and preparing cold food products.

In the form of the invention shown in Figs. 5 and 6 the construction is generally similar to that of the form first described, the only difference being in the sealing relationship of the extensible portion with the stationary part of the pan. In this second form the sealing edges 14a of the end wall 14 fit within channels or envelopes formed by overlying strips 15 which are welded or otherwise secured along their rear offset edges 15a with the side walls 10 of the pan. This construction forms a more effective seal than the form first described and is particularly effective where prepared food in semi-liquid state is poured into the pan.

In Fig. 7 a still different sealing construction is illustrated, wherein the ends or edges of the side walls 10 are bent back upon the body of the walls and then bent forward to form vertically disposed sealing strips 16 wherein the sealing flanges 14a of the extensible end wall may be seated.

From the foregoing description it will be seen that I have provided an economical and very useful food pan which enables a product, cooked or molded, to be sliced or cut and the slices taken from the pan without removal of the product.

It will, of course, be understood that various changes may be made in the form, arrangement, proportions and details of the several parts without departing from the scope of my invention.

What is claimed is:

1. A pan comprising, upstanding walls and a slidable bottom, one of said walls being secured to said bottom and extensible therewith, means associated with said other walls for guiding said slidable bottom, and said extensible wall having substantially perpendicular sealing flanges at the side edges thereof, said adjacent upstanding walls having vertical flanges secured thereto and having sealed relationship at the rear portions thereof with said upstanding walls and beneath which said first mentioned sealing flanges are adapted to be disposed to form in cooperation with said adjacent walls a sealed joint between said extensible walls and said adjacent walls.

2. A food preparing pan for permitting slices of prepared food to be taken without removal of the remainder of the food from the pan comprising, upstanding walls and a slidable bottom, one of said walls being secured to said bottom and extensible therewith, means associated with said other walls for guiding said slidable bottom, said extensible wall having turned flanges at the vertical ends thereof for engaging the adjacent walls to form a joint therewith, said flanges terminating in straight vertical edges adapted to guide a knife in slicing prepared food in said pan when said bottom is extended, said adjacent walls also terminating in straight vertical edges for guiding a slicing knife, and said adjacent walls having integrally formed down-turned flanges at the upper portions thereof beneath which the upper portions of said turned flanges are adapted to be disposed.

GERTRUDE S. PETERSON.